(12) United States Patent
Segal et al.

(10) Patent No.: US 9,582,620 B1
(45) Date of Patent: Feb. 28, 2017

(54) METHOD AND SYSTEM FOR AUTOMATED REFINED EXCLUSION OF ENTITIES FROM A METRIC DRIVEN VERIFICATION ANALYSIS SCORE

(71) Applicant: CADENCE DESIGN SYSTEMS, INC., San Jose, CA (US)

(72) Inventors: Nili Segal, Nirit (IL); Yael Kinderman, Givat Shmuel (IL); Hemant Gupta, New Delhi (IN); Oded Oren, Tel-Aviv (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/743,669

(22) Filed: Jun. 18, 2015

(51) Int. Cl.
*G06F 17/50* (2006.01)
*G06F 3/0482* (2013.01)
(Continued)

(52) U.S. Cl.
CPC ......... *G06F 17/5022* (2013.01); *G06F 3/0482* (2013.01); *G06F 3/04842* (2013.01);
(Continued)

(58) Field of Classification Search
CPC G06F 17/504; G06F 17/5022; G06F 17/5045; G06F 2217/78; G06F 11/261; G06F 11/263; G06F 11/3692; G06F 17/5009; G06F 17/5081; G06F 3/0482; G06F 3/04842; G06Q 10/0639; G06Q 10/06395; H04L 67/306
See application file for complete search history.

(56) References Cited

U.S. PATENT DOCUMENTS 6,856,950 B1 * 2/2005 Abts .................. G06F 17/5022
703/13
7,272,817 B1 * 9/2007 Hinkle .................. G06Q 10/00
703/27
(Continued)

OTHER PUBLICATIONS

Oikonomakos et al.; "An Integrated High-Level On-Line Test Synthesis Tool"; Year: 2006, IEEE Transactions on Computer-Aided Design of Integrated Circuits and Systems; vol. 25, Issue: 11; pp. 2479-2491.*

(Continued)

*Primary Examiner* — Helen Rossoshek
(74) *Attorney, Agent, or Firm* — Pearl Cohen Zedek Latzer Baratz LLP

(57) ABSTRACT

A computer implemented method and system for exclusion of entities from a metric driven verification analysis score. The method includes using a processor, and performing the following steps: parsing a source code simulating a device under test and modeling the source code into a model that includes entities of one or a plurality of metric driven entity types; identifying in the source code entities of the same metric driven entity type of said one or a plurality of metric driven entity types that are logically linked and saving information on the identified entities that are logically linked; receiving from a user a selection of an entity to be excluded from the metric driven verification analysis score; and excluding all instances of the selected entity and all instances of the identified entities that are logically linked to the selected entity from a calculation of the metric driven verification score.

20 Claims, 4 Drawing Sheets

(51) Int. Cl.
*G06F 11/26* (2006.01)
*G06F 11/36* (2006.01)
*G06F 3/0484* (2013.01)
*G06F 11/263* (2006.01)

(52) U.S. Cl.
CPC .......... *G06F 11/261* (2013.01); *G06F 11/263* (2013.01); *G06F 11/3692* (2013.01); *G06F 17/504* (2013.01); *G06F 17/5009* (2013.01); *G06F 17/5045* (2013.01); *G06F 17/5081* (2013.01); *G06F 2217/78* (2013.01)

(56) References Cited

U.S. PATENT DOCUMENTS

| | | | | |
|---|---|---|---|---|
| 7,661,050 B2* | 2/2010 | Huben | ........... | G01R 31/318385 |
| | | | | 714/724 |
| 7,870,523 B1* | 1/2011 | Uziel | .................... | G06F 11/263 |
| | | | | 703/2 |
| 7,886,242 B1* | 2/2011 | Chakraborti | ... | G01R 31/318307 |
| | | | | 716/106 |
| 8,108,745 B2* | 1/2012 | Kikta | ................... | G06F 11/263 |
| | | | | 714/733 |
| 8,413,088 B1* | 4/2013 | Armbruster | ......... | G06F 17/5022 |
| | | | | 716/100 |
| 8,448,112 B1* | 5/2013 | Kashai | ................ | G06F 17/5036 |
| | | | | 716/104 |
| 8,527,936 B2* | 9/2013 | Jain | .................... | G06F 17/5022 |
| | | | | 716/103 |
| 8,560,985 B1* | 10/2013 | Sahu | ................... | G06F 17/5022 |
| | | | | 716/106 |
| 8,560,991 B1* | 10/2013 | Fuss | .................... | G06F 17/5081 |
| | | | | 324/528 |
| 8,639,487 B1* | 1/2014 | Ezer | ...................... | G06F 17/505 |
| | | | | 703/13 |
| 8,726,224 B1* | 5/2014 | Giangarra | ........... | G06F 17/5036 |
| | | | | 716/132 |
| 8,732,630 B1* | 5/2014 | Kolpekwar | .... | G01R 31/318314 |
| | | | | 716/101 |
| 8,903,823 B1* | 12/2014 | Meir | ........................ | G06F 7/00 |
| | | | | 705/16 |
| 8,910,105 B1* | 12/2014 | Lawson | .............. | G06F 17/5077 |
| | | | | 716/126 |
| 9,098,637 B1* | 8/2015 | Sahu | .................... | G06F 11/3692 |
| 9,208,271 B1* | 12/2015 | Meir | .................... | G06F 17/5045 |
| 2011/0078651 A1* | 3/2011 | Ovadia | ............... | G06F 11/3608 |
| | | | | 717/105 |
| 2014/0172347 A1* | 6/2014 | Gavish | ................ | G06F 17/5081 |
| | | | | 702/123 |

OTHER PUBLICATIONS

Oikonomakos et al.; "Versatile high-level synthesis of self-checking datapaths using an on-line testability metric"; Year: 2003; Design, Automation and Test in Europe Conference and Exhibition, 2003; pp. 596-601, Papers (5).*

Lv et al.; "An efficient observability evaluation algorithm based on Factored Use-Def chains"; Year: 2003; Test Symposium, 2003. ATS 2003. 12th Asian; pp. 161-166, Papers (3).*

Paret Jomu George et al.; "A coverage driven test generation methodology using consistency algorithm"; Year: 2013; Quality Electronic Design (ASQED), 2013 5th Asia Symposium on ; pp. 27-32, IEEE Conference.*

* cited by examiner

FIG. 2A

Cover groups

| Ex | UNB | Name | Overall Avg Grade | Overall Covered |
|----|-----|------|-------------------|-----------------|
|    |     | cg1  | 83%*              | 10/14 (71%)     |
|    |     | cg2  | 35%               | 10/14 (20%)     |

Showing 2 items

Items of: cg2

| Ex | UNB | Name   | Overall Avg Grade | Overall Covered |
|----|-----|--------|-------------------|-----------------|
|    |     | A      | 43%*              | 3/7 (43%)       |
|    |     | B      | 50%*              | 4/8 (50%)       |
|    |     | AxB X1 | 30%*              | 6/16 (38%)      |
|    |     | AxB X2 | 9%*               | 6/64 (9%)       |

Bins of: A

| Ex | UNB | Name    | Overall Avg Grade | Overall Covered | Score |
|----|-----|---------|-------------------|-----------------|-------|
|    |     | opa[0]  | 100%              | 1/1(100%)       | 5928  |
|    |     | opa[1] | n/a            | 0/0 (n/a)       | 53586 |
|    |     | opa[2]  | 0%                | 0/1(0%)         | 0     |
|    |     | opa[3]  | 100%              | 1/1(100%)       | 12432 |
|    |     | opa[4]  | 0%                | 0/1(0%)         | 0     |
|    |     | opa[5]  | 0%                | 0/1(0%)         | 0     |
|    |     | opa[6]  | 0%                | 0/1(0%)         | 0     |
|    |     | opa[7]  | 100%              | 1/1(100%)       | 7145  |

Cover groups

| Ex | UNB | Name | Overall Avg Grade | Overall Covered |
|----|-----|------|-------------------|-----------------|
|    |     | cg1  | 83%*              | 10/14 (71%)     |
|    |     | cg2  | 37%*              | 17/93 (18%)     |

Showing 2 items

Items of: cg2

| Ex | UNB | Name   | Overall Avg Grade | Overall Covered |
|----|-----|--------|-------------------|-----------------|
|    |     | A      | 43%*              | 3/7 (43%)       |
|    |     | B      | 50%*              | 4/8 (50%)       |
|    |     | AxB X1 | 29%               | 4/14 (29%)      |
|    |     | AxB X2 | 9%*               | 6/64 (9%)       |

Bins of: AxB

| Ex | UNB | Name              | A      | B        | Overall Avg Grd | Overall Covered | Score |
|----|-----|-------------------|--------|----------|-----------------|-----------------|-------|
|    |     | opa[0].opb[0]     | opa[0] | opb[0]   | 100%            | 1/1(100%)       | 5928  |
|    |     | opa[1].opb[0]     | opb[1] | opb[0]   | n/a             | n/a             | 40452 |
|    |     | opa[1].opb[4]     | opb[1] | opb[4]   | n/a             | n/a             | 13134 |
|    |     | opa[3].opb[7]     | opb[3] | opb[7]   | 100%            | 1/1(100%)       | 12432 |
|    |     | opa[7].opb[3]     | opb[7] | opb[3]   | 100%            | 1/1(100%)       | 857   |
|    |     | opa[7].opb[4]     | opb[7] | opb[4]   | 100%            | 1/1(100%)       | 6288  |

202, 204, 206, 210, 212, 200

```
module top;
wire enable;
bottom b1(enable);
always@(clk)
  If (enable == 0)// COVERAGE BLOCK #1
    state = (reset==1)?0 : state;//COVERAGE BLOCK #2
else...
endmodule
module bottom(wire en);
...
endmodule
```

METHOD AND SYSTEM FOR AUTOMATED REFINED EXCLUSION OF ENTITIES FROM A METRIC DRIVEN VERIFICATION ANALYSIS SCORE

FIELD OF THE INVENTION

The present disclosure relates to metric driven verification (MDV). More specifically, the present invention relates to a method and system for exclusion of entities from a metric driven verification analysis score.

BACKGROUND OF THE INVENTION

One technique of examining and verifying a design of a hardware component such as an integrated circuit is to model operation of the design in software. For the purpose of modeling the design, its functionality may be described as procedures, for example, using a hardware design language (HDL). For example, HDL may represent various functions or operations of the hardware design as separate models or statements in the HDL code.

The software emulation of the hardware (referred to, hereinafter as "source code") may be operated in different configurations to test or verify operation of various functionalities of the component. A test may cause execution of all or some of the statements of the HDL code. A fraction or percentage of the statements or other entities in the HDL code that are covered by a test may be referred to as coverage. Coverage may relate to the entire set of HDL code, or to a part or block of HDL code. Coverage may refer to code (e.g., whether a block of code has been executed during a test), expressions (e.g., whether all possibilities in a truth table have been covered by a test), functionality, or other facets of the emulation.

Metric-driven verification (MDV) is concerned with analyzing what needs to be verified in a device under test (DUT) and how, and setting metrics that would allow determining the progress towards converging to desired goals. Such goals may be, for example, desired coverage level or levels.

A user may wish to exclude one or a plurality of entities from a calculation of the metric driven verification score, for various reasons.

SUMMARY OF THE INVENTION

There is thus provided, according to some embodiments of the present invention, a computer implemented method for exclusion of entities from a metric driven verification analysis score. The method may include using a processor, to perform parsing a source code and modeling the source code into a model that includes entities of one or a plurality of metric driven entity types; identifying in the source code entities of the same metric driven entity type of said one or a plurality of metric driven entity types that are logically linked, and saving information on the identified entities that are logically linked; receiving from a user a selection of an entity to be excluded from the metric driven verification analysis score; and excluding all instances of the selected entity and all instances of the identified entities that are logically linked to the selected entity from a calculation of the metric driven verification score.

In some embodiments of the present invention, the identified entities that are logically linked to the selected entity comprise entities that are semantically linked to the selected entity.

In some embodiments of the present invention, the selected entity is a bin and the identified entities are selected from the group consisting of all bin crosses with the bin, bin crosses of crosses with the bin.

In some embodiments of the present invention, the selected entity is a cover group, and the identified entities are instances of crosses with another cover group in which the selected entity group is contained.

In some embodiments of the present invention, the selected entity is a state, and the identified entities are transitions into or out of the state.

In some embodiments of the present invention, the selected entity comprises all transitions into or out of a state, and the identified entities comprises that state.

In some embodiments of the present invention, the selected entity is a code block, and the identified entities comprises all expressions contained in that block.

In some embodiments of the present invention, the selected entity is a toggle, and the identified entities comprises all toggles that are directly and logically connected to the toggle.

In some embodiments of the present invention, the method further includes distinctly indicating on a GUI all instances of the selected entity and all instances of the identified entities that are logically linked to the selected entity.

There is also provided, according to some embodiments of the present invention, a system for exclusion of entities from a metric driven verification analysis score. The system includes a storage device; and a processor, coupled to the storage device. The processor is configured to: parse a source code and model the source code into a model that includes entities of one or a plurality of metric driven entity types; identify in the source code entities of the same metric driven entity type of said one or a plurality of metric driven entity types that are logically linked and save information on the identified entities that are logically linked; receive from a user a selection of an entity to be excluded from the metric driven verification analysis score; and exclude all instances of the selected entity and all instances of the identified entities that are logically linked to the selected entity from a calculation of the metric driven verification score.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

FIG. 2A illustrates a graphical user interface (GUI) of a verification analysis tool according to some embodiments of the present invention, presenting cover items.

FIG. 2B illustrates a graphical user interface (GUI) of a verification analysis tool, in accordance with some embodiments of the present invention, depicting refined exclusion.

DETAILED DESCRIPTION OF THE INVENTION

Figure 1:
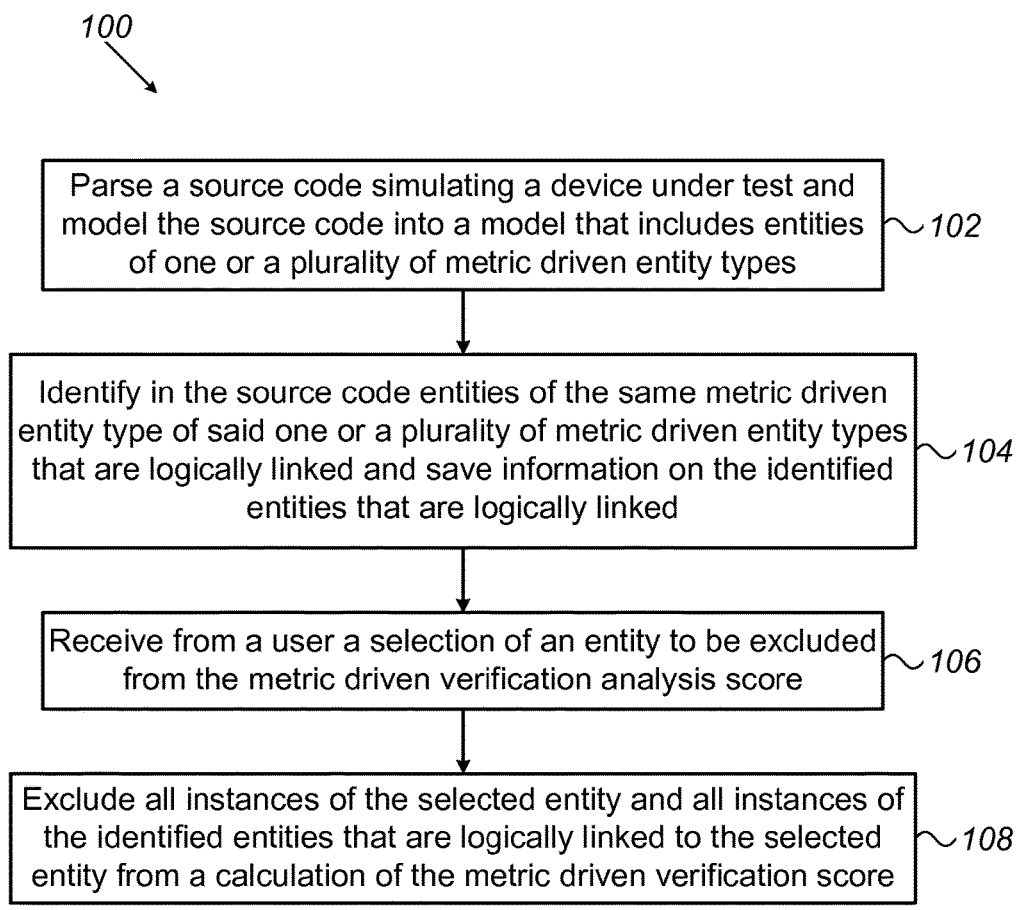
FIG. 1 illustrates a computer implemented method for automated refined exclusion of entities from a metric driven verification analysis score, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Metric-driven verification (MDV) is concerned with analyzing what needs to be verified in a DUT and how, and setting metrics that would allow determining the progress towards converging to desired goals. Such goals may be, for example, desired coverage level or levels.

Coverage is a metric used to assess coverage of a design during performance (execution). The quality of verification is measured using coverage tools. Code coverage is concerned with line or block coverage, arc coverage for state machines, expression coverage, event coverage and toggle coverage. Functional coverage is concerned with the coverage of the functionalities of the DUT. Functional coverage features may include coverage of variables and expressions, as well as cross coverage between them, automatic and user-defined coverage bins, associate bins with sets of values, transitions and cross products, filtering conditions at multiple levels, events and sequences to automatically trigger coverage sampling, procedural activation and query of coverage, and optional directives to control and regulate coverage. Functional verification involves changing the state of a logic design and verifying (by conducting various measurements) that the response generated by the design is correct (matches the planned response). Verification environments change the state of designs by driving stimulus in the form of directed or constrained random inputs.

Regardless of stimulus types, MDV relates to data-driven decision making providing clear metrics that are easily understood, to improve verification predictability, productivity and quality. MDV is a closed-loop process, starting with executable verification plans, to testbench creation, to execution, and finishing with measurements and analysis to determine what else needs to be done.

When a design of a Device Under Test (DUT) is verified, typically a DUT is modeled, and the model undergoes a series of tests aimed at verifying the DUT design or finding flaws (bugs) and repairing them.

A modeled DUT typically includes many entities that are interconnected, although the connection between these entities has not, to-date, been reflected and dealt with in the manned disclosed hereinafter.

A DUT model may include different representations of a model, each using different types of entities (or "instances") for different metrics types.

For example, a DUT model may be expressed in terms of cover groups, cover items, crosses and cover bins. In another example, relating to finite state machines (FSM) the model may be expressed in terms of states, transitions and arcs. In yet another example, a program code is expressed in code blocks, expressions and toggles.

A DUT model may contain many entities that are semantically linked, but not necessarily share a single execution flow.

For example, a cover items representation of a DUT model may include cover items, items, bins and crosses thereof. An FSM representation of a DUT model may include states and transitions. A code coverage representation of a DUT model may include code clocks. The code blocks may include expressions and toggles.

A user may wish to exclude one or a plurality of entities from a calculation of the metric driven verification score, for various reasons. For example, a verification expert (hereinafter—the user) may wish to exclude entities which appear to be well covered, or are not so well covered but are not important, etc., from a calculation of the metric driven verification score, thus causing a change in the overall score obtained. This is usually conducted to bring the score closer to a desired score.

To-date, a user has been able to select a certain entity, and exclude that entity from a calculation of the metric driven verification score. A user has been required to manually find all logically connected entities and manually exclude them.

Some embodiments of the present invention facilitate receiving a user selection of an entity for exclusion in a DUT model, and automatically applying exclusion on a given entity that would also exclude any relevant logically linked entities, as will be described hereinafter.

FIG. 1 illustrates a computer implemented method for automated refined exclusion of entities from a metric driven verification analysis score, according to some embodiments of the present invention.

Method 100 may include, using a processor, parsing 102 a source code simulating a device under test and modeling the source code into a model that includes entities of one or a plurality of metric driven entity types. Method 100 may also include identifying 104 in the source code entities of the same metric driven entity type of said one or a plurality of metric driven entity types that are logically linked and saving information on the identified entities that are logically linked. Method 100 may further include receiving 106 from a user a selection of an entity to be excluded from the metric driven verification analysis score and excluding 108 all instances of the selected entity and all instances of the identified entities that are logically linked to the selected entity from a calculation of the metric driven verification score.

In some embodiments of the invention, the identified entities that are logically linked to the selected entity may include entities that are semantically linked to the selected entity.

There are various metric driven entity types. For example, cover items, bins and crosses, FSM states and transitions, code blocks, expressions and toggles.

Reference is now made to FIG. 2A, which illustrates a graphical user interface (GUI) of a verification analysis tool according to some embodiments of the present invention. GUI 200 may present to a user, when displayed on a display device, information on entities of a certain type in the DUT model. For example, GUI 200 may include a frame 202 that presents a list of cover groups that were identified in the DUT model, e.g., cg1 and cg2. Frame 202 may also include information on the overall average grade that is calculated by the verification analysis tool for each cover item, as well as overall percentage covered score for each cover item. The user may select one of the cover groups (in the example of FIG. 2A, cover item cg2 appears to be selected), for example using an input device (e.g., a pointing device), upon which items relating to the selected cover group are presented to the user in GUI 200 in frame 204. In the example shown in FIG. 2A, frame 204 displays items relating to cover item cg2: A, B, cross A×B X1 and cross A×B X2. Upon the user selecting an item in frame 204 (in this example, it appears that the user has selected item A), bins relating to the selected item are displayed in frame 206.

According to some embodiments of the present invention, a user may select a bin for exclusion from the calculation of a verification analysis score, which would result in excluding all instances of the logically related entities. In this example, bin [opa1] 208 of item A is selected for exclusion, and as a result, all bins of cross A×B that include the bin [opa1] are also excluded. This is shown in FIG. 2B, which illustrates a graphical user interface (GUI) of a verification analysis tool, in accordance with some embodiments of the present invention, depicting the refined exclusion. When a user points to or otherwise selects 210 item A×B X1, the bins that include [opa1] as a value 212 appear excluded too (appear paler than other bin lines).

In another example, according to some embodiments of the present invention, when a user selects a cover item, all crosses that include that item are also automatically excluded. In still a further example, according to some embodiments, all crosses of crosses that include that item are automatically excluded. In still further example, according to some embodiments of the present invention, selecting a cover item automatically results in exclusion of instances of crosses with another cover group in which the selected cover group is contained.

Figure 3:
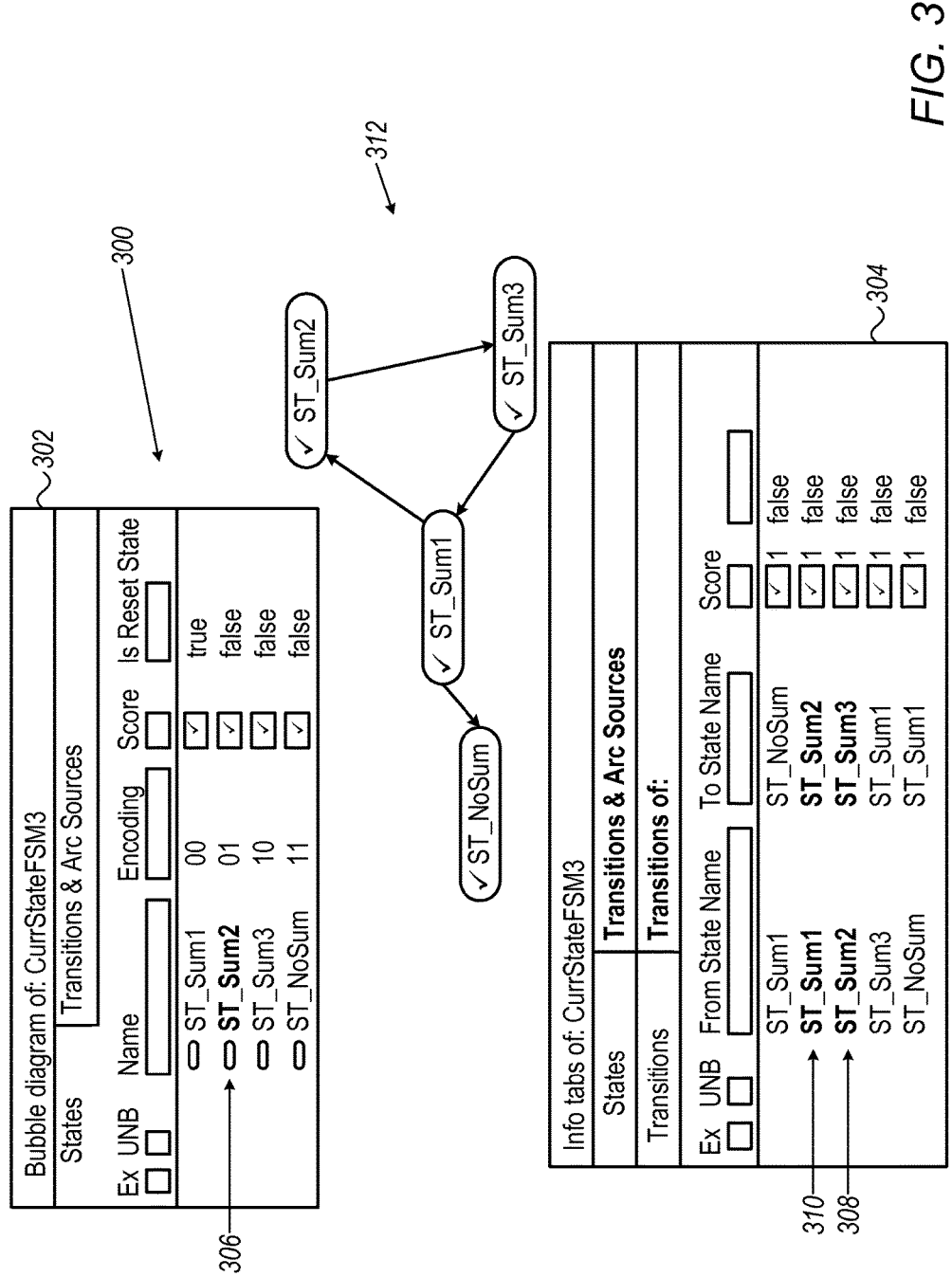
FIG. 3 illustrates a graphical user interface (GUI) of a verification analysis tool according to some embodiments of the present invention, presenting FSM entities (e.g., states, transitions and arcs).

FIG. 3 illustrates a graphical user interface (GUI) 300 of a verification analysis tool according to some embodiments of the present invention, presenting FSM entities (e.g., states, transitions and arcs).

GUI 300 may include a frame 302 for presenting states of a FSM. Additionally, GUI 300 may also include a frame 304 for presenting transitions and arc sources. Once a state of some FSM entity is excluded, there is no real need to take into consideration the transitions in or out of the excluded state, and so according to some embodiments of the present invention, arcs of the transition are excluded as well by the transition (the parent transition). In the example of FIG. 3, it is desired to exclude state ST_Sum2. When the user selects state ST_Sum2 the associated transitions ST_Sum1-->ST_Sum2, and ST_Sum2-->ST_Sum3, which are logically linked (semantically linked), are automatically excluded too. A relation map 312 between the states may also be presented in the GUI.

According to some embodiments of the present invention, when the user excludes all transitions (to or from) of a particular state, that state is automatically excluded as well.

Figures 4, 5:
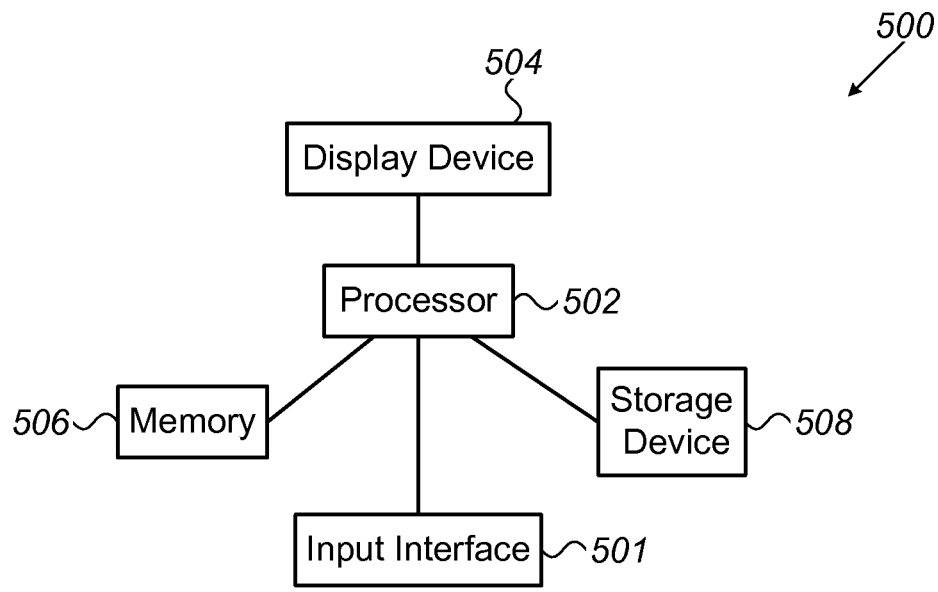
FIG. 4 illustrating a code portion which is a part of a DUT simulation.
FIG. 5 illustrates a system for metric driven verification that facilitates exclusion of entities from a metric driven verification analysis score, according to some embodiments of the present invention.

Another example is depicted in FIG. 4 illustrating a code portion 400 which is a part of a DUT simulation. According to some embodiments of the present invention, when a user selects a block for exclusion, all nested blocks are automatically excluded as well. For example, if the user selects to exclude COVERAGE BLOCK #1, then the nested block COVERAGE BLOCK #2 is automatically excluded too.

Similarly, according to some embodiments of the present invention, if a user selects to exclude an expression, all nested expressions within the selected expression are automatically also excluded.

According to some embodiments of the present invention, if the user selects to exclude a block, all expressions contained in that block are automatically excluded. For example, referring to the code portion in FIG. 4, if the user selects to exclude "COVERAGE BLOCK #2" from the calculation of a block coverage score, then expressions contained in the selected block, e.g., "(reset==1)" and "(enable==0)", are also excluded from a calculation of an expression coverage score.

According to some embodiments of the present invention, when a user selects a toggle for exclusion, then all other directly connected toggles are automatically excluded as well. In the example of FIG. 4, if the user selects to exclude "top.enable" from a calculation of toggle coverage score, then "top.b1.en" is also excluded from the calculation of the toggle coverage score.

In some embodiments of the present invention, when a user selects to exclude an expression, all connected blocks (e.g., all blocks whose execution is determined as a result of evaluation of the expression) are automatically also excluded. For example, if the user selects to exclude an expression, e.g., "(enable==0)" then automatically the block ("COVERAGE BLOCK #2") in which that expression is contained in is automatically also excluded.

According to some embodiments of the present invention, excluded entities may be distinctly indicated in the GUI, for example by highlighting these entities, placing a pointer or a mark adjacent to these entities, or otherwise uniquely marking them.

A metric driven verification analysis tool, according to some embodiments of the present invention, may include an option to allow the user to select entities for exclusion upon which all instances of the entities of the same type that are logically linked are automatically excluded too.

Alternatively, the metric driven verification analysis tool, according to some embodiments of the present invention, may include an option to allow the user to select entities for exclusion upon which only the selected entities are excluded.

Technically, identifying entities of the same metric driven entity type that are logically linked may is carried out, for example, by parsing a source code relating to the DUT model (e.g., software simulation) and modeling the source code into a model that includes entities of one or a plurality of metric driven entity types. All that information may be saved in a database, which may be subjected to queries. For example, the database may be generated in a UNICOV format.

In identifying logically linked entities various characteristics may be considered, for example, entities which are semantically linked. "Semantically linked", in the context of the present invention, refers to semantics as defined by the source code language.

For example, if a toggle entity is connected to another toggle entity, and as per semantics of source code language, these two toggle entities represent the same hardware wire, a logical connection may be established.

Together, as per the semantics of source code language, these toggle entities model the same hardware wire.

FIG. 5 illustrates a system 500 for metric driven verification that facilitates exclusion of entities from a metric driven verification analysis score, according to some embodiments of the present invention.

System 500 may include a processing unit 502 (e.g., one or a plurality of processors, on a single machine or distributed on a plurality of machines) for executing a method according to some embodiments of the present invention.

System 500 may include an input interface 501 for receiving data and instructions from a user, such as, for example, one or a plurality of keyboards, pointing devices, touch sensitive surfaces (e.g., touch sensitive screens), etc. for allowing a user to input commands and data. Processing unit 502 may be linked with memory 506 on which a program implementing a method according to some embodiments of the present invention and corresponding data may be loaded and run from and data may be saved, and storage device 508, which includes a non-transitory computer readable medium (or mediums) such as, for example, one or a plurality of hard disks, flash memory devices, etc. on which a program implementing a method according to some embodiments of the present invention and corresponding data may be stored. System 500 may further include an output device 504 (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that, when executed, cause a processor to execute method steps in accordance with examples. In some examples, the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for exclusion of entities from a coverage score, the method comprising:
   using a processor,
   receiving from a user via an input device, a selection of an entity for exclusion in a device under test (DUT) model, the DUT model including entities of one or a plurality of coverage metric-driven entity types;
   identifying in the DUT model entities of a same coverage metric driven entity type of said one or a plurality of coverage metric driven entity types that are logically linked to the user selected entity;
   excluding all instances of the selected entity and all instances of the identified entities that are logically linked to the selected entity in the DUT model; and
   calculating a coverage score on the DUT model with the excluded instances of the selected and identified entities.

2. The method of claim 1, wherein the identified entities that are logically linked to the selected entity comprise entities that are semantically linked to the selected entity.

3. The method of claim 1, wherein the selected entity is a bin, and the identified entities are selected from the group consisting of crosses that include the bin, and crosses of crosses that include the bin.

4. The method of claim 1, wherein the selected entity is a cover group, and the identified entities are instances of crosses with another cover group in which the selected entity group is contained.

5. The method of claim 1, wherein the selected entity is a state, and the identified entities are transitions into or out of the state.

6. The method of claim 1, wherein the selected entity comprises all transitions into or out of a state, and the identified entities comprises that state.

7. The method of claim 1, wherein the selected entity is a code block, and the identified entities comprises all expressions logically contained in that block.

8. The method of claim 1, wherein the selected entity is a toggle, and the identified entities comprises all toggles that are directly and logically connected to the toggle.

9. The method of claim 1, further comprising distinctly indicating on a GUI all instances of the selected entity and all instances of the identified entities that are logically linked to the selected entity.

10. A system for exclusion of entities from a coverage score, the system comprising:
    a storage device; and
    a processor coupled to the storage device and configured to:
    receive from a user via an input device, a selection of an entity for exclusion in a device under test (DUT)

model, the DUT model including entities of one or a plurality of coverage metric-driven entity types;

identify in the DUT model entities of a same coverage metric driven entity type of said one or a plurality of coverage metric driven entity types that are logically linked to the user selected entity;

exclude all instances of the selected entity and all instances of the identified entities that are logically linked to the selected entity in the DUT model; and calculate a coverage score on the DUT model with the excluded instances of the selected and identified entities.

11. The system of claim 10, wherein the identified entities that are logically linked to the selected entity comprise entities that are semantically linked to the selected entity.

12. The system of claim 10, wherein the selected entity is a bin, and the identified entities are selected from the group consisting of crosses that include the bin, and crosses of crosses that include the bin.

13. The system of claim 10, wherein the selected entity is a cover group, and the identified entities are instances of crosses with another cover group in which the selected entity group is contained.

14. The system of claim 10, wherein the selected entity is a state, and the identified entities are transitions into or out of the state.

15. The system of claim 10, wherein the selected entity comprises all transitions into or out of a state, and the identified entities comprises that state.

16. The system of claim 10, wherein the selected entity is a code block, and the identified entities comprises all expressions logically contained in that block.

17. The system of claim 10, wherein the selected entity is a toggle, and the identified entities comprises all toggles that are directly and logically connected to the toggle.

18. The system of claim 10, further comprising a display device for distinctly indicating on a GUI all instances of the selected entity and all instances of the identified entities that are logically linked to the selected entity.

19. A non-transitory computer readable storage medium for exclusion of entities from a coverage score, having stored thereon instructions that, when executed by a processor, will cause the processor to:

receive from a user via an input device, a selection of an entity for exclusion in a device under test (DUT) model, the DUT model including entities of one or a plurality of coverage metric-driven entity types;

identify in the DUT model entities of a same coverage metric driven entity type of said one or a plurality of coverage metric driven entity types that are logically linked to the user selected entity;

exclude all instances of the selected entity and all instances of the identified entities that are logically linked to the selected entity in the DUT model; and calculate a coverage score on the DUT model with the excluded instances of the selected and identified entities.

20. The method according to claim 1, wherein said one or a plurality of coverage metric driven entity types are selected from the group consisting of cover items, bins, crosses, finite state machine (FSM) states, FSM transitions, code blocks, expressions, and toggles.

* * * * *